AUTOMATIC TELEGRAPH STATION SELECTOR

Filed April 23, 1954 2 Sheets-Sheet 1

INVENTOR
ROBERT L. DOERRFELD
BY Emery Robinson
ATTORNEY

Feb. 17, 1959 R. L. DOERRFELD 2,874,210

AUTOMATIC TELEGRAPH STATION SELECTOR

Filed April 23, 1954 2 Sheets-Sheet 2

INVENTOR
ROBERT L. DOERRFELD

BY Emery Robinson
ATTORNEY

United States Patent Office

2,874,210

Patented Feb. 17, 1959

2,874,210

AUTOMATIC TELEGRAPH STATION SELECTOR

Robert L. Doerrfeld, Bellwood, Ill., assignor to Teletype Corporation, Chicago, Ill., a corporation of Delaware Application April 23, 1954, Serial No. 425,259

10 Claims. (Cl. 178—2)

This invention relates to automatic telegraph station selectors and more particularly to systems having a plurality of receiving stations permanently connected to a transmission channel, but which may be selectively disabled from responding to transmitted messages.

In many telegraph transmission systems all the transmitting and receiving stations are permanently connected to a signaling channel because it would involve too great an expense to provide switching offices to selectively interconnect certain stations with a transmitting station. Obviously, it is desirable to suppress recording of messages at stations which are not concerned with the contents of said messages. Heretofore, several such devices have been developed, however, these devices have been limited in adaptability to incorporation in various specific pieces of equipment or have involved the utilization of rather complex mechanisms in their construction or have employed the use of rather complicated circuitry.

It is a primary object of the invention to provide a simple and inexpensive station selector possessing the characteristic of versatility to incorporation in various types of recorders.

Another object of the invention resides in the utilization of of electromagnetic expedients in the design of station selector circuits which are adapted to suppress printing and spacing at a station upon reception of a preconcerted sequence of signals.

A further object commensurate with the last object resides in the utilization of certain novel circuits for precluding printing or spacing of the recorder by the physical interruption of the operation of the printing and spacing mechanism in said recorder or by interrupting the operation of the recorder motor or by rendering the selector magnets of the recorder non-responsive to incoming signals.

An additional object of the invention is the provision of two sequentially operable circuits wherein the sequential operation of a first one of said circuits precludes the operation of the second circuit.

The present invention is described with respect to a printing telegraph apparatus of the type shown in the patent to W. J. Zenner, No. 2,339,313, dated January 18, 1944. However it is to be understood that the station selector hereinafter described may be readily incorporated in nearly all types of existing printing or other recording devices operated in accordance with the receipt of telegraph signals. In the following description only those portions of the Zenner printer which facilitate an understanding of the present invention will be discussed and the reader's attention is directed to the Zenner patent specification for a complete description of the details of the components comprising the printer.

With these and other objects in view, the present invention contemplates a station selector adapted to be incorporated in each of a plurality of remotely located telegraph recorders. Each station selector comprises two pairs of sequentially operable electromagnetic devices. A disabling device is provided at each of the remotely located stations and is adapted to be controlled by the sequential operation of said pairs of electromagnetic devices. These electromagnetic devices are shown in the present invention as being relays which physically move contacts into position to break or make circuits as the situation requires.

In one embodiment of the invention, the sequential reception of a first preconcerted sequence of signals energizes a circuit to hold the recorder disabling apparatus from operation thereby permitting this station to receive a subsequently transmitted message. At other stations wherein the first pair of relays have not been operated and a second preconcerted sequence of signals has been received, a circuit is completed to operate the disabling apparatus located at this station whereby subsequently transmitted messages are not recorded.

Other objects and advantages of the present invention will be apparent from the following detailed description when considered in conjunction with the accompanying drawings wherein.

Figure 1:
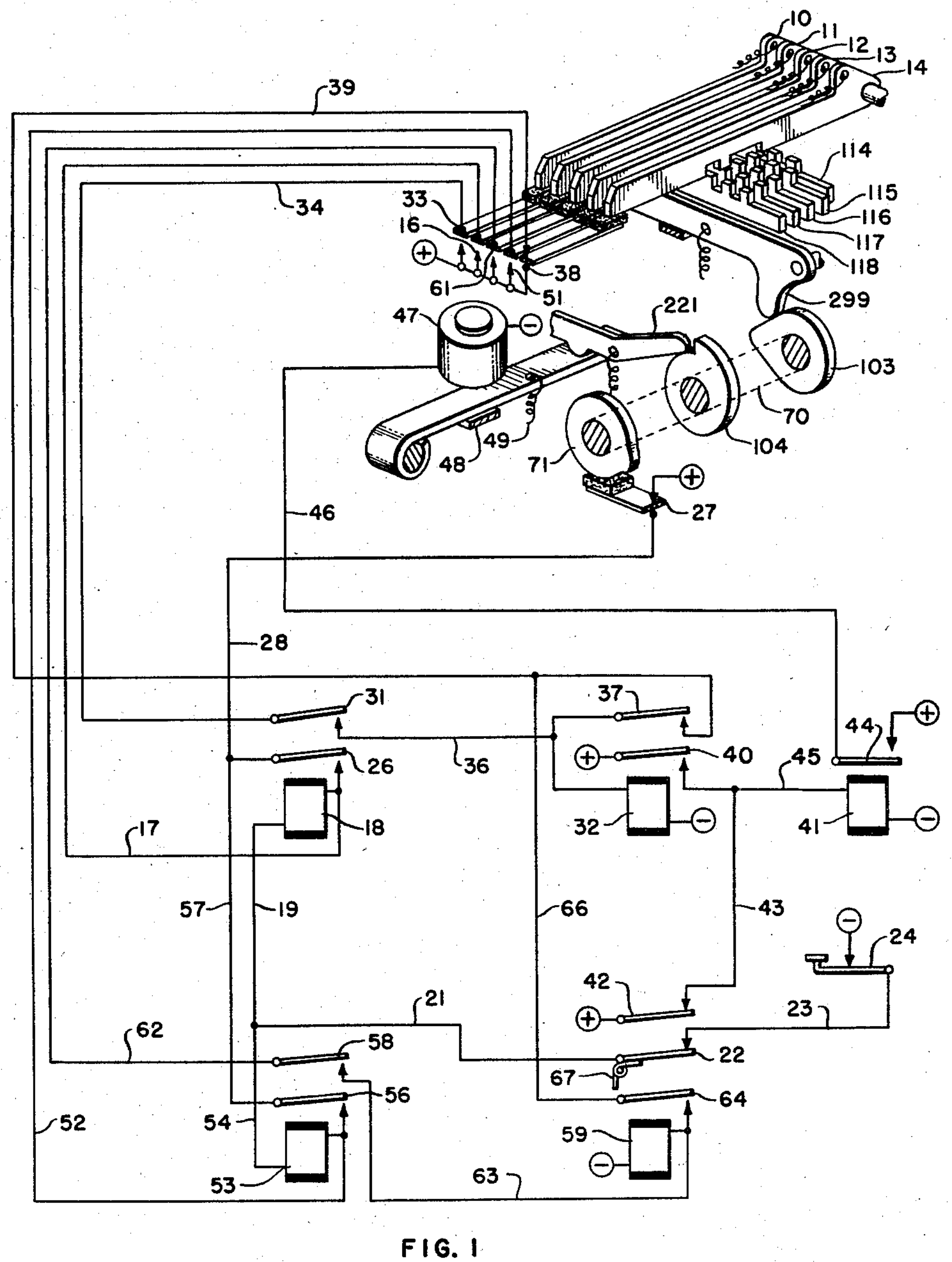
Fig. 1 illustrates a portion of the recorder mechanism shown in the afore-identified Zenner patent together with a station selector circuit embodying the principal features of the present invention.

In the upper right-hand portion of Fig. 1 there is shown a portion of a tape printer of the type shown in the afore-identified Zenner patent application. Whenever possible, numerical designations are utilized to represent elements in Fig 1 which correspond with the numerical designations utilized to identify corresponding elements shown in the Zenner patent.

Specifically, in both the present description and in the Zenner patent there is shown a plurality of slidably mounted selector bars 114 to 118 which are adapted to be permutatively positioned in accordance with the receipt of incoming telegraph signals. Upon each selective positionment of the slidable bars 114 to 118, mechanisms are actuated to effectuate either the printing of characters or the performance of desired functions.

Positioned in overlying relationship to the slidable bars 114 to 118 are a set of five coded bars 10 to 14, each having formed on its lower surface an arrangement of permutative notches. These coded bars are held from engagement with the slidable bars 114 to 118 through the instrumentality of a lever 299, adapted to be moved by a cam 103 mounted on the cam shaft 70 of the recorder.

Upon each receipt of a telegraph signal, the slidable bars 114 to 118 are permutatively positioned to present a permutative ararngement of projections thereon to the underside of the coded bars 10 to 14. Shortly after the positionment of the slidable bars the cam 103 permits the spring biased lever 299 to drop in a downward direction thereby permitting the coded bars to engage the slidable bars. If a permutation of projections on the bars 114 to 118 corresponded with the permutation of notches formed in one of said coded bars 10 to 14, then this particular bare will move downwardly, further than the other and may be considered selected.

In order to effectuate a selection of the station shown in Fig. 1, a sequence of signals which may be considered representative of the letters A and B is transmitted from the distant transmitting station to sequentially position the slidable bars 114 to 118 in two succeeding permutations. When the signal representative of the character A is received, the coded bar 11 has a permutation of notches formed thereon which permits its selection by the permutative setting assumed by slidable bars 114 to 118, whereupon a contact pair designated by the reference numeral 16 is closed. Closure of the contact pair 16 completes a circuit which may be traced from positive battery, through the now closed contact pair 16, over a lead 17, through a relay 18, over a lead 19, over a lead 21, through a normally closed contact 22, over a lead 23, through a manually operated switch 24 to negative battery. Energization of the relay 18 draws up a front contact 26 to complete a locking circuit for the relay which may be traced from positive battery through a timing contact pair 27, over a lead 28, through the now drawn up contact 26, through the relay 18, over the leads 19 and 21, through the contact 22, over the lead 23, through the switch 24, to negative battery. Energization of the relay 18 also effectuates a drawing up of an upper contact 31, to condition a circuit to a relay 32, which may be traced from a contact pair 33 associated with the coded bar 10, over a lead 34, through the now drawn up contact 31, over a lead 36, through said relay 32 to negative battery.

When the next signal for selection of this station, which is the character B, is received, the coded bar 10 is selected to close the contact 33 to apply positive battery to the conditioned circuit described in the last paragraph. Instantly, the relay 32 is energized to draw up an upper contact 37 to complete a locking circuit for the relay 32 which may be traced from positive battery through a normally closed blank contact 38, over a lead 39, through the now drawn up contact 37, through the relay 32 to negative battery. Energization of the relay 32 also effectuates the drawing up of a contact 40 to apply positive battery therethrough and over a lead 45, through a relay 41, to negative battery. The relay 41 is designed to control the operation of the disabling mechanism of the recorder shown at the station in Fig. 1, and when said relay is maintained in an energized condition, said station will not be disabled and will respond to subsequently transmitted messages. This relay 41 is normally maintained in an energized condition through a circuit which may be traced from positive battery through a normally closed contact 42, over a lead 43, over the lead 45 and through said relay 41 to negative battery.

In the situation where said relay 41 is de-energized a contact 44 is permitted to close, thereby completing a circuit which may be traced from positive battery, through said contact 44, over a lead 46, through a relatively strong electromagnet 47 to negative battery. When said electromagnet 47 is energized, a pivotally mounted armature 48 therefor is drawn up against the action of a spring 49 to engage a lever 221 and move said lever from engagement with a cam 104 mounted on the shaft 70. As described in the Zenner patent, the lever 221 controls the functioning of the spacing and printing mechanisms in the recorder. Consequently the disablement of this lever will preclude the recorder from responding to subsequently transmitted signals.

Upon the assumption that relays 18 and 32 have not been operated and it is desired to disable the recorder shown in Fig. 1, then a sequence of signals representative of the Figures and Carriage Return functions is transmitted through the system. The receipt of the Figures signal effectuates the selection of the coded bar 13 to close a contact pair 51, whereupon a circuit is completed which may be traced from positive battery through the now closed contact pair 51, over a lead 52, through a relay 53, over a lead 54, over the lead 21, through the normally closed contact 22, over the lead 23, through the switch 24 to negative battery. Energization of the relay 53 instantly draws up a contact 56 to complete a locking circuit for said relay which may be traced from positive battery, through the timing switch 27, over the lead 28, over a lead 57, through the now drawn up contact 56, through the relay 53 and over the leads 54, 21 and 23, through the switch 24 to negative battery. Energization of the relay 53 also draws up a contact 58 to condition a circuit for operation of a relay 59, which may be traced from a normally open contact pair 61, over a lead 62, through the now drawn up contact 58, over a lead 63, through the relay 59 to negative battery.

When the next signal of the disabling sequence, the Carriage Return signal, is received by the recorder the coded bar 12 is selected to close the contact pair 61 and apply positive battery over the conditioned circuit described in the last paragraph to thereby energize the relay 59. Energization of the relay 59 first draws up an armature 64 to complete a locking circuit for said relay which may be traced from positive battery, through the normally closed contact pair 38, over the lead 39, over a lead 66, through the now drawn up contact 64, through the relay 59, to negative battery. When relay 59 is energized, the contact 22 is also drawn up, but this contact is provided with a biasing spring 67 to preclude its instant movement thereby permitting the locking circuit for the relay 53 to be maintained until after the contact 64 is closed. If the contact 22 opened before the contact 64 closed, then the relay 53 would be de-energized to release the contact 58, thereby interrupting the energizing circuit to the relay 59 and thus precluding its continued operation. Obviously, when the contact 22 eventually opens after this momentary delay, the holding circuit for the relay 53 is broken, thereby de-energizing this relay to permit the release of its associated contacts.

The occurrence of the energization of the relay 59 also effectuates the drawing up of its upper contact 42 to disrupt the circuit previously traced to the relay 41. Recalling that this relay received positive battery through contact 42, and that the contact 40 is not closed, then the relay 41 is de-energized. De-energization of relay 41 permits the contact 44 to close thereby completing the energizing circuit for the electromagnet 47. Energization of the electromagnet 47 draws up the pivotally mounted armature 48 thereby moving the lever 221 from the cam 104. As previously mentioned and as described in detail in the Zenner patent, the lever 221 controls the printing and spacing operations of the recorder, thus the removal of this lever from the cam 104 prevents the recorder from performing the printing and spacing operations.

Considering now the function of the timing contact 27, it may be noted that said contact is cyclically opened by a cam 71 during each rotation of the shaft 70, but is only opened for a portion of the period in which the contact pairs 16 and 51 are closed. The purpose of the timing contact is to insure that the relays 18 and 32 or 53 and 59 are operated only in response to the afore-discussed sequence of contiguous signals. If the relay 18 is operated and the following signal is not in accordance with the AB sequence, then during the receipt of this other signal the timing contact will open to disrupt the locking circuit for relay 18.

Figure 2:
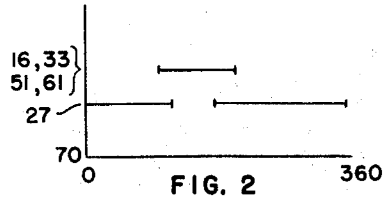
Fig. 2 is a timing diagram showing the period of operation of certain contacts in the circuit shown in Fig. 1 with respect to the period of operation of the drive shaft of the recorder.

Referring now to Fig. 2 wherein a timing diagram is shown for the period of operation of the contacts with respect to the period of rotation of the shaft 70, the solid portion of the middle line represents a period in which the timing contact 27 is closed and the upper solid line represents the period in which the contact pairs 16, 33, 51 and 61 are closed. It may be instantly noted that the period of closure of the contact pairs 16, 33, 51 and 61 overlaps the period in which the timing contact 27 is operated. When the relays 18 and 32 are operated by a contiguous squence of signals representative of the letters AB, then the opening of the timing contact 27 is ineffective to disrupt this sequential operation of relays, but if the second signal were representative of a letter other than B, then the relay 32 would not function immediately following the operation of the relay 18. In this instance the reception of this letter other than B does not close the contact pair 33, and, consequently, the opening of the timing contact 27 resulting from the operation of the shaft 70 breaks the locking circuit for relay 18 and restores the circuit to the condition shown in Fig. 1. In a like manner, when it is desired to disable the recorder, the reception of a sequence other than Figures followed by Carriage Return effectuates a release of the relay 53 by the opening of the timing contact 27 prior to the operation of relay 59.

In order to prevent the false selection of a station having a first identifying code letter the same as the second identifying code letter of a previously selected station, a spacing signal is transmitted to release the relay operated in response to the second letter of the sequence utilized to select the previously selected station. For example, assume that there are three stations in the system having respectively the call letters AB—BC—CG and it is desired to select the stations identified as AB and CG, but not the station BC. Obviously, when the signal B is transmitted as part of the sequence to select the first station AB, the first relay associated with the station BC will respond to the B signal, then when the letter C is transmitted as the first of the identifying signals for the station CG then the second relay (identical to relay 32) will respond to the receipt of the C signal and the station BC will be selected. It may be appreciated that the transmission of a signal representative of a spacing function between each transmission of signals representing each station, will effectuate the release of any first relays actuated by the receipt of the B signal, and the subsequent reception of the C signal as the first part of the identifying sequence of the station CG will be ineffective to condition the station BC for reception of subsequent transmitted messages. This is true because during the receipt of the spacing signal, the cam 71 will open contact 27 to release any relays 18 that have been operated as a result of the receipt of the B signal.

When all stations in the system have been selected and the remaining stations precluded from receiving the messages, the messages are transmitted over the signaling channel followed by the transmission of a signal representative of a Blank function. Reception of the signal representative of the Blank function causes the coded bar 14 to be selected, whereupon the contact pair 38 is open to remove positive battery from the relays 32 or 59, depending upon which one has been operated to restore the selector circuit to the unoperated condition preparatory to the receipt of subsequent station selecting or precluding sequence of signals. As a result of this operation, all stations are now in a condition to receive transmitted messages. Consequently in order to issue a general call to all stations in the network it is only necessary to precede the transmission of a message with a signal representative of a Blank function to assure that all stations are in condition to receive the message.

In passing it might be well to note that when relays 18 and 32 are sequentially operated and the relay 32 is locked in an energized condition, then the subsequent reception of the sequence of signals representative of the Figures and Carriage Return functions sequentially operates the relays 53 and 59 to draw up the contact 42, whereupon one source of positive battery is removed from the relay 41, but as the contact 38 is closed to establish an alternative source of positive battery to keep relay 41 energized, the net result of the reception of the disabling sequence of signals is ineffective at this station.

Figure 3:
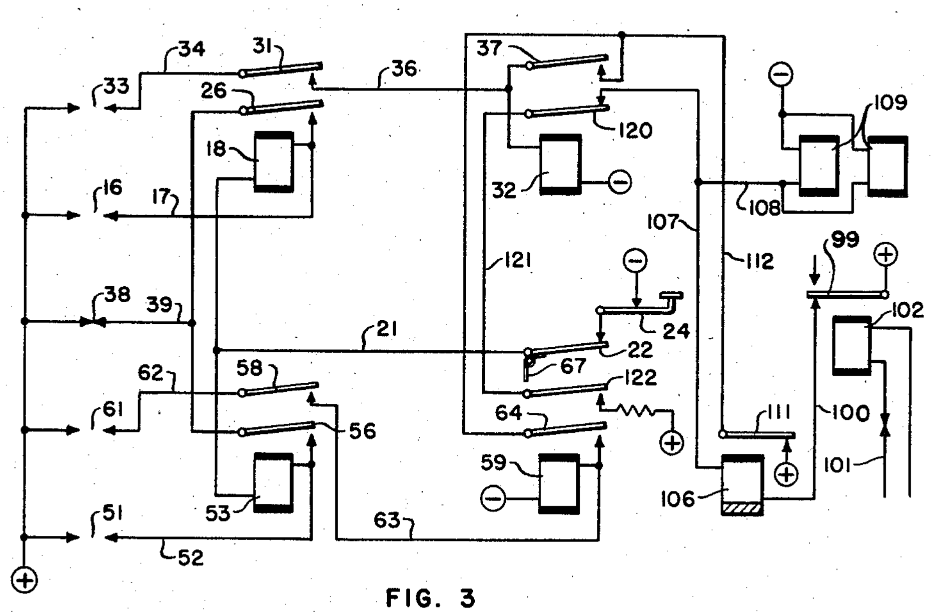
Fig. 3 is another circuit diagram showing another embodiment of the invention shown in Fig. 1 wherein a selector magnet of a recorder may be disabled.

In Fig. 3 a modified embodiment of the invention is disclosed and in this instance wherever components are identical to the components shown in Fig. 1 identical numerical designations are utilized. In the description of this embodiment of the invention repetition of the tracing of the circuits will be eliminated except when necessary to make the feature of this embodiment apparent.

The signaling line interconnecting all of the outlying stations is designated by the reference numeral 101 and has signals impressed thereon representative of station selecting or station precluding operations together with message signals. A line relay 102 connected in the signaling line is accordingly actuated by received signals. As a positive impulse is received over said signaling line, the line relay 102 will draw up an armature 99 to apply positive battery over a line 100, through a slow to release magnet 106, over a lead 107, over a lead 108, through a pair of selector magnets 109 to negative battery. The selector magnets 109 control instrumentalities (not shown) to permutatively position the slidable bars 114 to 118. The slow to release magnet 106, when de-energized for a prolonged period of time, releases a contact 111 to remove positive battery from a lead 112 connected to contacts 37 and 64. As previously indicated in the description of the embodiment of the invention shown in Fig. 1, the contacts 37 and 64 control the locking circuits for the relays 32 and 59, respectively.

Assume that a station such as shown in Fig. 3 is to be selected, then the transmission of the sequence of signals representative of the A and B characters sequentially closes the contacts 16 and 33 to sequentially energize the relays 18 and 32 in the manner heretofore explained. Operation of the relay 32 open break contacts 120 which interconnects the lead 108 extending to the selector magnets 109 and a lead 121 extending to an armature 122 associated with the relay 59. Inspection of Fig. 3 instantly indicates that the contact 122 is open; consequently, the opening of the contacts 120 is of no effect at this time.

Considering now the situation wherein it is desired to preclude the operation of the recorder shown in Fig. 3 when said relays 18 and 32 have not been sequentially operated, then the sequential transmission of the signals, representative of the Figures and Carriage Return functions, sequentially energizes the relays 53 and 59. When the relay 32 is unoperated, the energization of the relay 59 draws up the contact 122 to complete a circuit from positive battery through the contact 122, over the lead 121, through the closed contact 120, over the lead 108, through the selector magnets 109, to negative battery. Inasmuch as the relay 59 is locked in an energized condition, the selector magnets 109 will be maintained in a continuous energized state thereby being rendered nonresponsive to signaling impulses received over the line 101.

It is to be again noted that when a station is selected and a relay 32 is energized, the contact 120 is open. The subsequent reception of the sequence of signals representative of the Figures and Carriage Resturn functions results in the energization of the relay 59 to close the contact 122. Closure of the contact 122 is ineffective to establish the shunt circuit because the contact 120 is now open.

In order to clear the system for reception of new station selecting or precluding signals, the tranmission line 101 is opened for a prolonged period of time equal to the time normally consumed in the transmission of several signals. The magnet 102 is thereby de-energized to release the armature 99 and, after a period of time, the slow to release magnet 106 is also de-energized resulting in the release of the contact 111 from the source of positive battery. This source of positive battery was utilized to supply energy to the actuated relays 32 or 59 to hold said relays in a locked condition. Obviously the interruption of the locking circuits result in the deenergization of these relays to restore the circuit to the unoperated condition as shown in Fig. 3.

Figure 4:
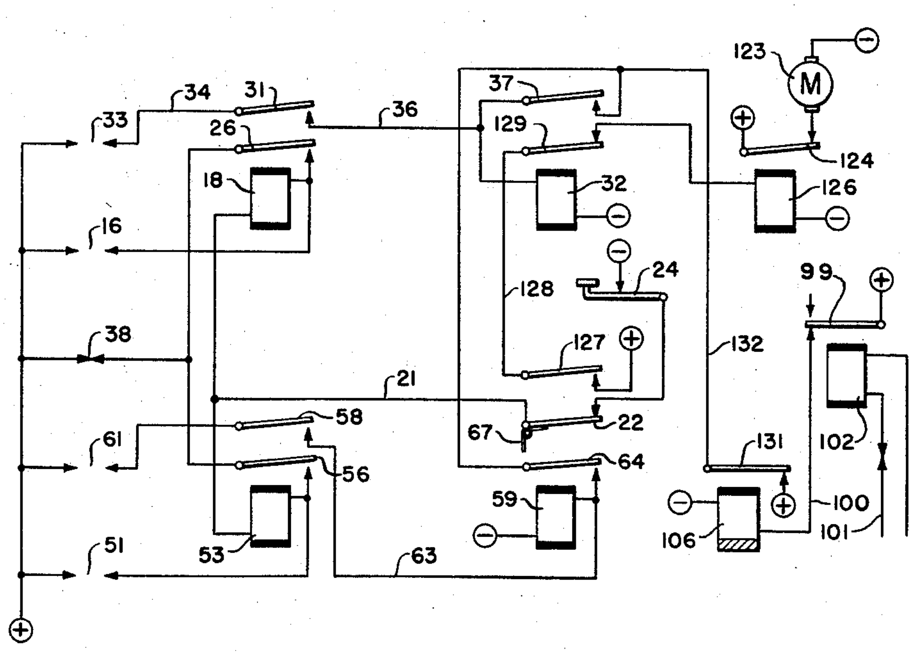
Fig. 4 is still another circuit diagram illustrating an additional embodiment of the station selector shown in Fig. 1 wherein a recorder motor may be disabled.

Considering now the circuit shown in Fig. 4 which is another modification of the basic circuit shown in Fig. 1, identical reference numerals will be utilized to identify parts which are common to both circuits. Again the signal line 101 is shown as controlling the energization of a line relay 102, which in turn draws up armature 99 to apply positive battery over a lead 100, through the slow to release magnet 106 to negative battery. In this modification, a motor 123 is shown which is utilized to drive the shaft 70 (Fig. 1) and consequently control the operation of the recorder. If the energizing circuit of this motor, which includes a contact 124, can be interrupted, then the recorder will not respond to signals transmitted over the line 101. Contact 124 is controlled by a relay 126 adapted to be energized by a circuit which may be traced from positive battery, through a contact 127 when drawn up by the relay 59, over a lead 128, through a normally closed contact 129, through the relay 126 to negative battery.

When a sequence of signals is received to operate the contact pairs 16 and 33 to sequentially energize the relays 18 and 32, the contact 129 is opened to provide a second opening in the energizing circuit for the relay 126. At stations where the relays 18 and 32 have not been operated and the sequence of signals representative of the Figures and Carriage Return signals is transmitted over the line 101, the contacts 51 and 61 are operated to sequentially operate the relays 53 and 59, whereupon the contact 127 is drawn up. Closure of the contact 127 results in the completion of a circuit which may be traced from positive battery, through the now closed contact 127, over the lead 128, through the contact 129, associated with the de-energized relay 32, through the relay 126 to negative battery. Energization of the relay 126 instantly draws up the contact 124 to interrupt the energizing circuit for the motor 123; consequently, the motor comes to rest and the recorder can no longer operate in response to the receipt of signals received over the line 101.

Attention is directed to the fact that when the relay 32 is energized, the contact 129 is drawn up so that the subsequent energization of relay 59 in response to the station precluding sequence of signals merely closes the contact 127, but the energizing circuit to the relay 126 is not completed due to the now open contact 129.

When a message has been transmitted through the system and it is desired to restore all the receiving stations to the original unoperated condition, the line 101 is interrupted for a prolonged period of time equal to the duration normally taken to transmit several individual signals. Relay 102 is thereby de-energized to allow its contact to move into engagement with an upper inert contact. Positive battery is now removed from the slow to release magnet 106 for a sufficient period of time to allow said relay to release a contact 131 which serves to supply positive battery over a lead 132, to the contacts 37 and 64. It is to be recalled that if either of these contacts had been drawn up then a locking circuit would have been established to the respective relay 32 or 59; manifestly, since battery is no longer applied to the contacts, the locking circuits are interrupted and these relays will be released to restore the circuit to the unoperated condition shown in Fig. 4.

It is possible to locally condition a recorder to receive all subsequently transmitted messages. This may be accomplished by opening the manual switch 24, through which it will be recalled, served as, a source of negative potential is connected to both the relays 18 and 53; thus when station selector or precluding signals are received, relays 18 and 53 are precluded from operation. In order to preclude a station it is necessary that the relay 53 be operated and since this relay is now incapable of operation it is impossible to disable the recorder at any station where the local switch 24 has been opened.

In order to change the call letters to which any station responds, it is only necessary that the bars 10 and 11 be removed and new bars, having permutations of wards representative of the new call letters, be inserted in place thereof.

It is to be understood that the above described arrangements of circuit components and construction of elemental parts are simply illustrative of the application of the principles of the invention and many other modifications may be made without departing from the invention.

What is claimed is:

1. In a telegraph system having a plurality of stations to be selectively conditioned to receive messages, selectively operable means at each station including a first pair of means adapted to be sequentially operated by the receipt of a first predetermined sequence of signals, enabling means operated by said first means for conditioning said station to receive subsequently transmitted messages, a second pair of means adapted to be sequentially operated by the receipt of a second predetermined sequence of signals, and precluding means operated by the second means of said second pair of means for making the station non-responsive to subsequently transmitted messages.

2. In a telegraph system having a plurality of stations permanently connected to a signaling channel wherein certain of said stations can be rendered nonresponsive to transmitted signals, selectively operable means at each of said stations comprising a first pair of means sequentially operated in response to a first predetermined sequence of signals, enabling means operated by the sequential operation of said first pair of means for conditioning said station to receive subsequently transmitted signals, a second pair of means sequentially operated in response to a second predetermined sequence of signals, precluding means operated by the sequential operation of said second pair of means for rendering the station nonresponsive to subsequently transmitted signals, and means operated by the sequential operation of the first pair of means for rendering ineffective operation of the precluding means by the sequential operation of the second pair of means.

3. In a telegraph communication system having a plurality of stations to be selectively conditioned to receive messages wherein each station includes a plurality of mechanical elements adapted to be individually selected and moved by the receipt of predetermined signals, a first means operated by the movement of a first element in response to the receipt of a first predetermined signal, a second means conditioned for operation by the operation of the first means, means operated by the movement of another of said elements for operating said conditioned second means, enabling means operated by said second means for conditioning said station to receive subsequently transmitted signals, a third means operated by the movement of a third one of said elements, a fourth means conditioned for operation by said third means, means operated by a fourth one of said elements for operating said conditioned fourth means, means controlled by the operation of said fourth means for precluding said station from responding to said subsequently transmitted messages, and means controlled by the operation of said second means for rendering the operation of said fourth means non-effective.

4. In a telegraph system having a plurality of stations adapted to be selectively conditioned to receive messages, selectively operable means at each station including a first relay circuit adapted to be operated by a first predetermined sequence of signals, means operated by said first relay circuit for enabling the station to receive subsequently transmitted messages, a second relay circuit adapted to be operated by a second predetermined sequence of signals, means operated by said second relay circuit for preventing the station from responding to subsequently transmitted messages, and means controlled by the operation of said first relay circuit adapted to render ineffective said last mentioned preventing means.

5. In a printer having elements adapted to be selectively moved in accordance with incoming signals, electrical means for selectively permitting or preventing printing operations comprising a first relay circuit adapted to be operated by one of said elements being moved in accordance with the receipt of a first predetermined signal, a second relay circuit conditioned for operation by the operation of the first relay circuit, said conditioned second relay circuit adapted to be operated by another of said elements being moved in accordance with the receipt of a second predetermined signal, means controlled by the energization of said second circuit for permitting printing operations, a third relay circuit adapted to be operated by another of said elements being moved in accordance with the receipt of a third predetermined signal, a fourth relay circuit conditioned for operation by the operation of the third relay circuit, said conditioned third relay circuit adapted to be operated by another of said elements being moved in accordance with the receipt of a fourth predetermined signal, and means controlled by the energization of said fourth circuit for preventing printing operations, said means controlled by the operation of said second relay circuit rendering ineffective said last mentioned means.

6. In an automatic station selector having a printer thereat, a first normally open relay circuit, a second normally open relay circuit adapted to be conditioned by said first relay circuit, means responsive to a first signal for energizing said first relay circuit to condition said second relay circuit for operation, means responsive to a second predetermined signal for energizing said previously conditioned second relay circuit, means for preventing the printer from operating upon the receipt of signals, a first means normally effective for disabling said preventing means, additional means operated by said second relay circuit for holding said disabling means effective, and means responsive to a preconcerted sequence of signals for rendering ineffective said first means for preventing the operation of the printer.

7. In an automatic station selector for use in a multistation system, means at each station adapted to be selectively operated in accordance with signals transmitted through said system, a means operated by the selective means upon receipt therein of a first predetermined signal, a first conditioning means operated by operation of said first means, a second means operated by the selective means upon receipt therein of a second predetermined signal in conjunction with the operation of said first conditioning means, means for disabling the station from receiving signals, means operated by said second means for precluding the operation of the disabling means, a third means operated by the selective means upon receipt therein of a third predetermined signal, a second conditioning means operated by the operation of said third means, fourth means operated by the selective means upon receipt therein of a fourth predetermined signal in conjunction with the operation of said second conditioning means when said second means has not been operated, and means operated by said fourth means for operating the disabling means.

8. In an automatic station selector associated with a normally operative motor driven telegraph printer, means adapted to suspend the operation of the motor, a first relay circuit, means responsive to a first sequence of signals for operating said first relay circuit, a second relay circuit, means responsive to a second sequence of signals for operating said second relay circuit, means actuated by said second relay circuit for operating said motor operation suspending means, and means operated by said first relay means for rendering ineffective the operation of the second relay means.

9. In a station selector associated with a telegraph recorder having included therein a selector mechanism operated in accordance with the receipt of telegraph signals, a first multi-unit relay circuit adapted to be sequentially operated by operation of the selector mechanism in response to a first predetermined sequence of signals, a second multi-unit relay circuit adapted to be sequentially operated by operation of the selector mechanism in response to a second predetermined sequence of signals, recorder disabling means, means operated by the operation of said second multi-unit relay circuit for actuating said disabling means, and means actuated by the operation of said first multi-unit relay circuit for rendering ineffective the operation of said second multi-unit relay circuit.

10. In a telegraph system having a plurality of stations adapted to be selectively conditioned to receive message signals or to preclude such message signals upon the receipt of two predetermined sequences of signals, a plurality of relays at each of the stations, a holding circuit associated with each of the relays, first means actuatable by the receipt of a first signal in a first of the sequences for energizing a first of the relays to condition a second of the relays for energization, second means actuatable by a receipt of a second signal in the first sequence for energizing the second, conditioned relay, third means actuatable by the receipt of a first signal of the second of the sequences for energizing a third of the relays to condition a fourth of the relays for energization, fourth means actuatable by the receipt of the second signal in the second sequence for energizing the fourth, conditioned relay, a pair of contacts connected in the holding circuits of the first and third relays, means for opening the contacts for a predetermined time between the successive operations of said first and second actuatable means and for a predetermined time between the successive operations of said third and fourth actuatable means to preclude the energization of the second relay other than upon operation of said second actuatable means following in direct sequence said first actuatable means and of the fourth relay other than upon operation of said fourth actuatable means following in direct sequence said third actuatable means, means actuated by an energized second relay for permitting the station to respond to message signals, and means actuated by an energized fourth relay for precluding the station from responding to message signals.

References Cited in the file of this patent

UNITED STATES PATENTS

| | | |
|---|---|---|
| 1,039,988 | Mollina | Oct. 1, 1912 |
| 1,943,475 | Gurley | Jan. 16, 1934 |
| 2,148,435 | Carr | Feb. 28, 1939 |
| 2,152,010 | Zenner | Mar. 28, 1939 |
| 2,419,729 | Potts | Apr. 20, 1947 |
| 2,495,452 | Grove | Jan. 24, 1950 |
| 2,659,879 | Pappenfus | Nov. 13, 1953 |